Aug. 3, 1954 A. A. ROBINSON 2,685,407

CIRCUIT FOR MULTIPLYING BINARY NUMBERS

Filed Dec. 12, 1949 3 Sheets-Sheet 1

A. A. Robinson
*Inventor*
By Moore & Hall
*Attorneys*

A. A. Robinson
*Inventor*
By Moore & Hall
*Attorneys*

CIRCUIT FOR MULTIPLYING BINARY NUMBERS

Filed Dec. 12, 1949 3 Sheets-Sheet 3

A. A. Robinson
*Inventor*
By Moore & Hall
*Attorneys*

Patented Aug. 3, 1954

2,685,407

UNITED STATES PATENT OFFICE 2,685,407

CIRCUIT FOR MULTIPLYING BINARY NUMBERS

Arthur A. Robinson, Scunthorpe, England, assignor to National Research Development Corporation, London, England, a British corporation Application December 12, 1949, Serial No. 132,579

Claims priority, application Great Britain December 23, 1948

13 Claims. (Cl. 235—61)

Figure 1:
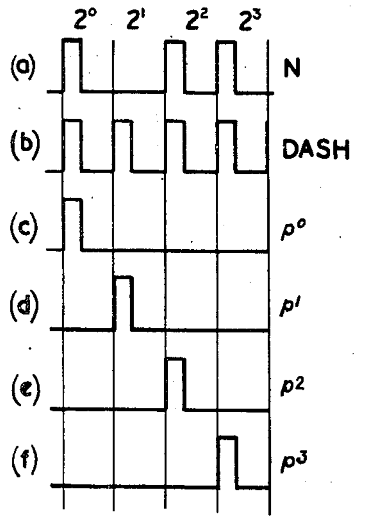

This invention relates to circuit arrangements for performing the process of multiplication between two numbers, each in binary-digital form in the series mode, i. e. the digits in each number each being represented by an electrical signal occurring in its allotted instant.

In binary arithmetic notation a number N is represented by the series:

$$N=\sum_{k=0}^{k=n-1} a_k 2^k \qquad (1)$$

where the number $a_k$ is two valued being "0" or "1." Thus for example the binary number 10011, with the least significant figure being represented at the right hand end, represents the member 19 in decimal notation. Thus in this number:

$$a_0=1$$
$$a_1=1$$
$$a_2=0$$
$$a_3=0$$
$$a_4=1$$

Therefore $$N=a_0 2^0+a_1 2^1+a_2 2^2+ \dots$$
$$=1\times1+1\times2+0\times2^2+0\times2^3+1\times2^4$$
$$=1+2+16$$
$$=19$$

Now the product obtained by multiplying together two numbers N, M will be given by the series:

$$NM=\sum_{k=0}^{k=n-1} (a_k 2^k M)$$

According to the present invention in one aspect thereof there is provided a circuit for obtaining a signal representing the product of two numbers each of which is represented in the binary scale of notation by a signal comprising a series of sequentially occurring electrical pulses, characterized by a sequence of gate circuits arranged to be conditioned respectively by the digit pulses of one of said numbers, means for feeding the signal representing the other of said numbers to all said gate circuits simultaneously, a sequence of delay devices each of which is arranged to introduce a delay equal to the inter-digit period of the signals representing the said numbers and a sequence of adding devices; the first adding device in said sequence being fed through the first delay device in said sequence with the output from the first gate in said sequence and directly with the output of the second gate circuit of said sequence, the second adding device being fed through the second delay device in said sequence with the output from said first adding device and directly with the output from the third gate circuit in said sequence and the remaining adding devices, delay devices and gate circuits being connected in similar manner so as to yield at the output of the last adding device in the said sequence the required signal.

The inter-digit period referred to is, of course, the time interval between a pulse in a number signal and a pulse of next higher (or lower) significance.

According to the present invention in another aspect thereof there is provided a multiplying circuit for multiplying two binary numbers a multiplicand M, and a multiplier represented by the series $a_k 2^k + a_{k-1} 2^{k-1} \dots + a_1 2^1 + a_0 2^0$ ($a_k$, $a_{k-1}$ etc. being either "1" or "0") in each of which the digit "1" is represented by a signal of a first kind and the digit "0" is represented by a signal of a second kind, the signal representing a digit occurring in an instant which is separated from the instant in which the signal representing the digits of next higher and next lower significance occur by a predetermined time (the inter-digit period) and comprising $k+1$ devices, one for each digit of the multiplier, each adapted to be conditioned by a signal representing a different digit of the multiplier, means for conditioning the devices by signals representing the multiplier, means for feeding to all the devices signals representing the multiplicand M whereby to obtain from the respective devices signals representing the numbers $M{:}a_k$, $M{:}a_{k-1}$, . . . $M{:}a_1$ and $M{:}a_0$ and means for adding the outputs from all said devices in a plurality of series-connected adding devices, the first adding device in the series receiving the output from the device adapted to be conditioned by the signal in the multiplier representing the digit of highest significance via a delay device introducing a delay equal to the inter-digit period and each subsequent adding device receiving the output of the preceding adding device via a delay device introducing a delay equal to the inter-digit period.

According to the present invention in yet another aspect thereof there is provided a multiplying circuit for multiplying two binary numbers (the multiplier and multiplicand) in each of which the digit "1" is represented by a pulse and the digit "0" by the absence of a pulse, the signal representing each digit being allocated a separate instant which is separated from the signal representing the digit of next higher and next lower significance by a predetermined time (the interdigit period) and comprising a plurality of normally non-conducting gate circuits, one for each digit of the multiplier, each of which is adapted to be conditioned by a signal representing a different digit in the multiplier, means for rendering a gate circuit conducting if the signal adapted to condition it is a pulse (i. e. a "1"), means for applying the train of pulses representing the multiplicand to all of said gate circuits, and means for adding the outputs from all of said gate circuits in a plurality of series connected adding devices, the first adding device in the series receiving its input from the gate circuit adapted to be conditioned by the signal in the multiplier representing the digit of highest significance via a delay device introducing a delay equal to the inter-digit period and each subsequent adding device receiving the output of the previous adding device via a delay device introducing a delay equal to the inter-digit period.

Figure 2:
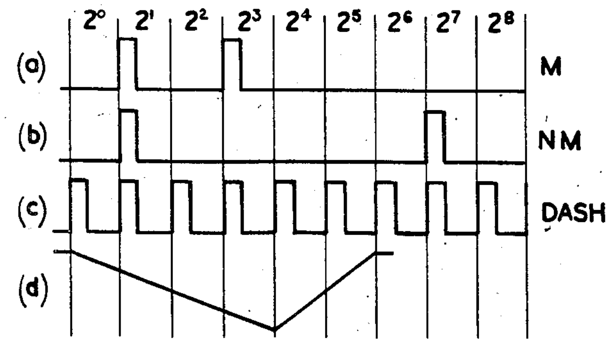
Figure 3:
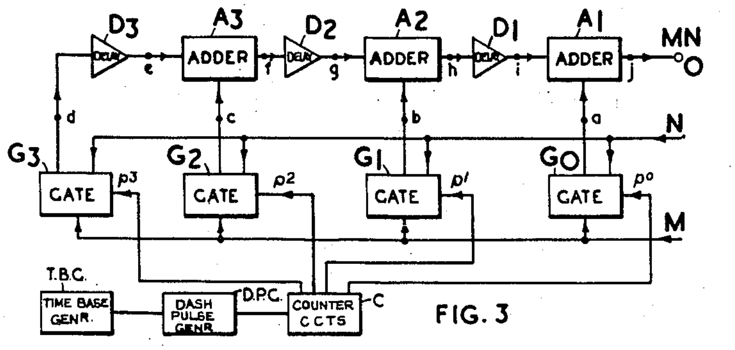
Figure 4:
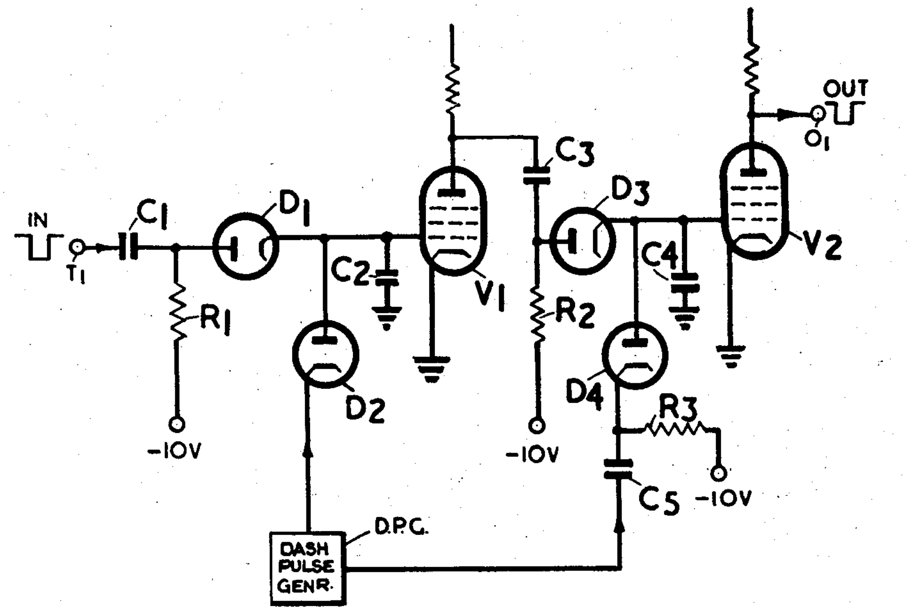
Figure 5:
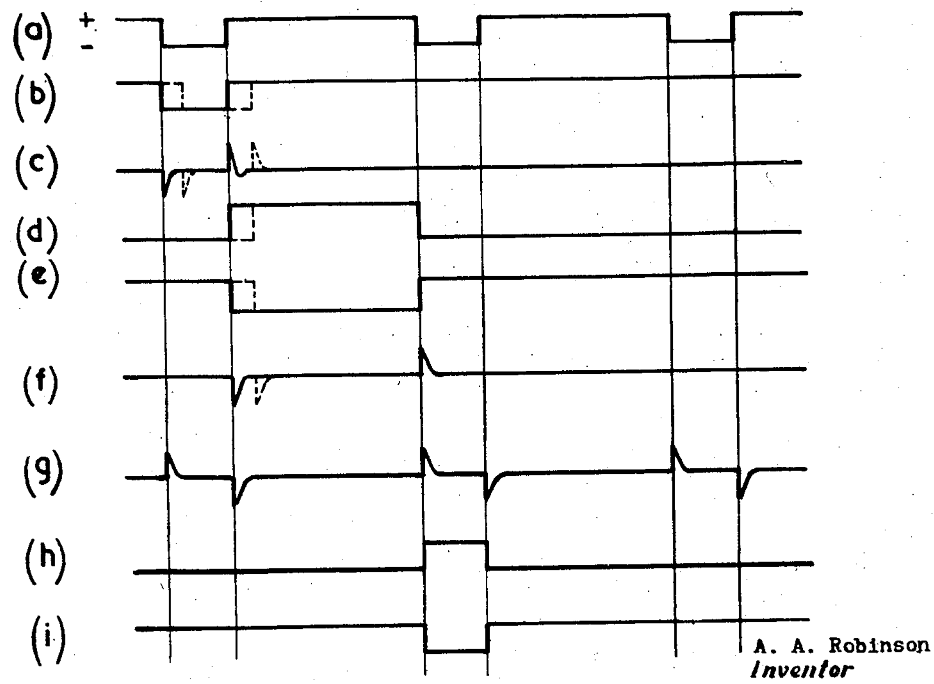
Figure 6:
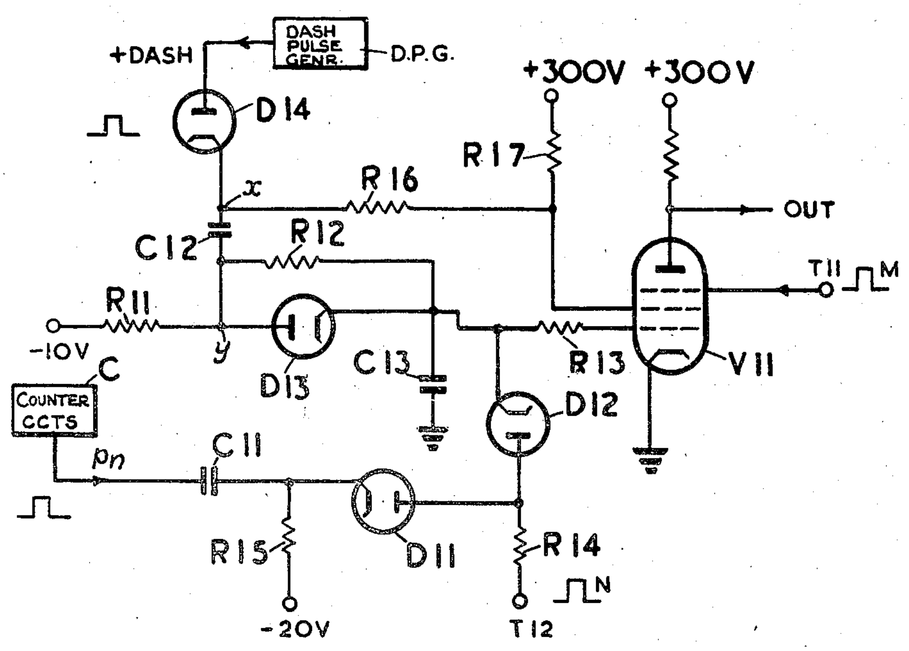
Figure 7:
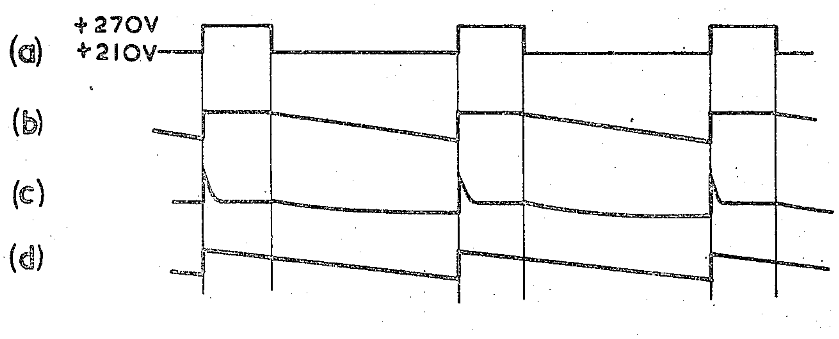

In order that this invention may be more clearly understood and readily carried into effect reference will now be made to the accompanying drawings in which:

Fig. 1 shows waveforms illustrating the operation of the multiplying circuit shown in Fig. 3, Fig. 2 also shows waveforms illustrating the operation of the multiplying circuit shown in Fig. 3, Fig. 3 shows in block schematic form a multiplying circuit according to this invention, Fig. 4 shows a circuit diagram of a delay circuit suitable for use with the multiplying circuit shown in Fig. 3, Fig. 5 shows waveforms illustrating the operation of the delay circuit shown in Fig. 4, Fig. 6 shows a circuit diagram of a gate circuit suitable for use with the multiplying circuit shown in Fig. 3 and Fig. 7 shows waveforms illustrating the operation of the multiplying circuit shown in Fig. 3.

In Fig. 1 waveform (*a*) represents the binary number 1011 (thirteen) as it would be applied to the multiplier (N) input of the multiplying circuit of Fig. 3. The waveform consists of three positive pulses occurring respectively in three or four instants of time, viz. those allocated respectively to the digits $2^0$, $2^2$ and $2^3$. The instant of time allocated to $2^1$ contains no pulse as the product of $2^1$ 1011 (i. e. $1.2^0+0.2^1+1.2^2+1.2^3$) is 0. Fig. 2(*a*) shows the binary number 0101 (ten) as it would be applied to the multiplicand (M) input of the multiplying circuit of Fig. 3 and Fig. 2(*b*) represents the product of the two numbers 01000001 (one hundred and thirty) as it would appear at the output of the multiplying circuit.

Fig. 3 illustrates in block schematic form a multiplying circuit which, for simplicity, is shown in a form suitable for multiplying two four digit numbers, a multiplier N and a multiplicand M. The circuit comprises a pulse generator DPG which produces regularly recurring pulses, hereinafter referred to as dash pulses, which are used as timing pulses to synchronize all the correlated parts of the apparatus. These dash pulses are shown in Figs. 1(*b*) and 2(*c*) and have a time interval between them equal to that between a pulse representing "1" digit and a pulse representing a "1" digit of next higher or next lower significance. This time interval is referred to as the inter-digit period. Pulses from the dash pulse generator DPG are fed to counter circuits C which produce at each of four output points a pulse referred to as a *p* pulse; the four pulses occurring simultaneously with the four pulses representing the digits $2^0$, $2^1$, $2^2$, $2^3$ of the multiplier (N) respectively. A suitable type of circuit arrangement which may be employed for the counter circuits C is described in copending United States application Serial No. 132,580, filed December 12, 1949, for Pulse Selecting Circuits. The *p* pulses occurring simultaneously with the digits $2^0$, $2^1$, $2^2$, $2^3$, referred to respectively as the *p*0, *p*1, *p*2 and *p*3 pulses are shown in Figs. 1(*c*), 1(*d*), 1(*e*) and 1(*f*) respectively. Pulses from the dash pulse generator DPG are also used to synchronize a time-base generator TBG which produces a time base voltage shown in Fig. 2(*d*) having a run down during 4 digit periods and a flyback portion during 2 digit periods.

In the operation of multiplication the train of pulses representing the multiplier (N) and the train of pulses representing the multiplicand (M) do not occur together, the pulses representing the multiplier (N) being made available first. The gate circuits G0, G1, G2 and G3 are fed in parallel with the pulses representing the multiplier (N) and are also fed with the *p*0, *p*1, *p*2 and *p*3 pulses respectively. The gate circuits G0—G3 are normally non-conducting but are such that they are rendered conducting if they receive a multiplier (N) pulse and *p* pulse simultaneously: thus if the multiplier (N) contains a pulse representing $1.2^0$ the gate circuit G0 will be rendered conducting and similarly for the gate circuits G1, G2 and G3. After the multiplier (N) pulses and *p* pulses have been fed to the gate circuits in order to condition them, the train of pulses representing the multiplicand (M) is fed in parallel to all the gate circuits. The pulses representing the multiplicand will only pass through those circuits which have been rendered conducting by the pulses of the multiplier (N). The pulses appearing at the outputs *a*, *b*, *c* and *d* of the gate circuits G0, G1, G2 and G3 are thus representative of numbers which are as follows:

At $a$ $M.a_0$
At $b$ $M.a_1$
At $c$ $M.a_2$
At $d$ $M.a_3$ where $a_0$, $a_1$, $a_2$ and $a_3$ are respectively the coefficients ("1" or "0") of $2^0$, $2^1$, $2^2$ and $2^3$ in the multiplier (N). At point *e* following the delay device D3, which introduces a delay equal to the interdigit period, pulses representing the number 2 $M.a_3$ will thus appear and at other points indicated on Fig. 3 as *f*, *g*, *h*, *i* and *j* there will appear pulses representing numbers as follows:

At $f$ $M(a_2+2a_3)$
At $g$ $M(2a_2+2^2a_3)$
At $h$ $M(a_1+2a_2+2^2a_3)$
At $i$ $M(2a_1+2^2a_2+2^3a_3)$
At $j$ $M(a_0+2a_1+2^2a_2+2^3a_3)$

It will be seen that at the point *j*, the output terminal O of the multiplier, pulses representing a number $$M\left(\sum_{k=0}^{k=3} a_k 2^k\right)$$

will appear. This number is the product MN.

Two four digit numbers when multiplied may produce an eight digit number and thus the process of multiplication, apart from the initial setting up of the multiplying circuit, may occupy a time interval equal to twice that required for the expression in dynamic form of either of the four digit numbers comprising the multiplier (N) or multiplicand (M). This time interval is the minimum one in which the eight digit product number (MN) can be expressed dynamically.

An advantage of the multiplying circuit in accordance with this invention is that since all the adding devices are separated by delay devices, any delay inherent in the design of the adding devices, is, within limits, unimportant, as it can be allowed for in the design of the delay devices.

The adding device A1, A2 and A3 may be of any suitable known kind but a preferred form is described in the specification of co-pending United States application Serial No. 132,581, filed December 12, 1949, now Patent No. 2,643,820, for Circuit For Adding Binary Numbers.

A preferred form of delay device suitable for the delay devices D1, D2 or D3 will now be described with reference to the circuit diagram of Fig. 4 and the explanatory waveform diagram Fig. 5.

A negative digit pulse representing a "1" digit and obtained from the gate circuit G3 in the case of the delay device D3 and from the adding devices A3 and A2 in the case of the delay devices D2 and D1 respectively is shown in Fig. 5(*b*). The reason why this digit pulse is negative is that the gate circuits G0—G3 produces polarity reversal of the multiplicand (M) pulses applied to them. The negative digit pulse is applied via an input terminal T1 (Fig. 4) of the delay device to a differentiating circuit C1, R1 which differentiates the pulse to produce a sharp negative pulse coincidently with its leading edge and a sharp positive pulse coincidently with its trailing edge; these differentiated pulses being shown in Fig. 5(*c*). One end of the resistance R1 is connected to the anode of a diode D1 the cathode of which is connected to the control grid of a valve V1 and the other end is taken to a source of —10 volts. As a result only the sharp positive pulse (Fig. 5(*c*)) is applied to the control grid of the valve V1. Negative dash pulses (Fig. 5*a*) from the dash pulse generator DPG are applied to the control grid of the valve V1 via a diode D2 and the negative-going leading edges of these pulses cut off the anode current of the valve V1. However, the sharp positive pulse (Fig. 5(*c*)) obtained from the differentiation of the digit pulse will turn on the anode current. A condenser C2 having a small capacity connected between the control grid of valve V1 and earth holds the potential on the control grid steady unless the control grid is driven: it thus holds the potential on the grid at a steady value during the intervals between dash pulses. Thus in response to a digit pulse applied to the terminal T1 the anode current of the valve V1 (which is initially cut off by the leading edge of a negative dash pulse) will be turned on by the sharp positive pulse (Fig. 5(*c*)) obtained from the trailing edge of a digit pulse and will remain turned on until the leading edge of a negative dash pulse cuts it off again. The potential on the control grid of the valve V1 in response to an applied digit pulse is shown in Fig. 5(*d*) and the potential at the anode of the valve is shown in Fig. 5(*e*). If no digit pulse is applied to the terminal T1 during a digit period, i. e. if a "0" is obtained from the gate circuit G3 or adding devices A1 and A2 as the case may be, the anode current of the valve V1 will remain cut off during the digit periods.

The anode of the valve V1 is connected via a condenser C3 and a diode D3 to the control grid of a valve V2, the anode current of which is normally cut off by a negative bias voltage of —10 volts fed to its control grid via a resistance R3 and a diode D4. The condenser C3 is connected through a resistance R2 to a source of —10 volts and the circuit C3, R2 forms a differentiating circuit. The pulse at the anode of valve V1 (Fig. 5(*e*)) is differentiated by the differentiating circuit C3, R2 to produce a sharp negative pulse and a sharp positive pulse shown in Fig. 5(*f*), the sharp positive pulse being coincident with the leading edge of the dash pulse occurring in the digit period next to the one in which the digit pulse which causes it occurs. The sharp negative pulse (Fig. 5(*f*)) cannot get through the diode D3 but the sharp positive pulse (Fig. 5(*f*)) is passed by the diode D3 to the control grid of the valve V2 and turns on the anode current of this valve. Positive dash pulses from the dash pulse generator DPG are fed via a condenser C5 to the cathode of the diode D4 the anode of which is connected to the control grid of the valve V2. The condenser C5 and a resistance R3 form a differentiating circuit which differentiates an applied positive dash pulse to produce a sharp positive pulse coincidently with the leading edge and a sharp negative pulse coincidently with the trailing edge; these sharp pulses being shown in Fig. 5(*g*). The sharp positive pulse from the dash pulse (Fig. 5(*g*)) renders the diode D4 non-conducting and enables the sharp positive pulse at the anode of the diode D3 (Fig. 5(*f*)) to turn on the anode current of the valve V2. The anode current of the valve V2 then remains turned on until cut off by the negative going trailing edge of a positive dash pulse applied to the diode D4. The resultant potentials on the grid and anode of the valve V2 under these conditions is shown in Figs. 5(*h*) and 5(*i*) respectively. If there is no sharp pulse at the anode of the diode D3, due to no digit pulse being applied to the terminal T1, the anode current of the valve V2 remains cut off. A condenser C4, having a small capacity and connected between the control grid of the valve V2 and earth, prevents the potential on the control grid of the valve changing unless the grid is driven. Thus there is delivered at an output terminal O1 connected to the anode of the valve V2 a digit pulse (Fig. 5(*i*)) delayed one digit period with respect to the digit pulse applied to the input terminal T1.

The dotted waveforms of Figs. 5(*b*)–5(*f*) indicate the effect of a slight delay of the input digit pulse with respect to a dash pulse and as can be seen from these waveforms the delay in rendering the valve V1 conducting has no effect on the timing of the output pulse obtained from anode of the valve V2 (Fig. 5(*i*)). Thus a delay in the adding circuits A3 or A2 is entirely absorbed within the delay circuit provided that the delay does not cause the trailing edge of a digit pulse to approach so close in time the leading edge of a succeeding dash pulse that the anode voltage of the valve V1 in the delay circuit does not have time to fall adequately before the anode current of the valve is cut off again by a negative dash pulse.

A gate circuit G0, G1, G2 or G3 which is required to be conditioned by the relevant pulse in the multiplier (N) and retain its condition until the multiplication has been completed will now be described with reference to the circuit diagram, Fig. 6, and the explanatory waveform, diagram, Fig. 7. The gate circuit comprises a pentode valve V11 whose current is normally cut off by a bias potential of —10 volts fed to its control grid via resistances R11, R12 and R13. The multiplier (N), as a positive pulse train, is fed from a negative resting level via a terminal T12 and resistance R14 to the anode of a normally non-conducting diode D12. The anode of the diode D12 is connected to the anode of a diode D11 which is normally held conducting by a bias potential of —20 volts fed to its cathode via a resistance R15, this bias potential providing the resting level for the multiplier (N) pulse train at the anode of the diode D12. A positive *p* pulse (*p*0 for gate circuit G0 etc.) from the counter circuits C is fed via a condenser C11 to the cathode of the diode D11 and renders the diode non-conducting during its occurrence. If there is a digit pulse in the multiplier (N) coincident with the applied *p* pulse the diode D12 is rendered conducting and the potential on the control grid of valve V11 is raised to a value sufficient to turn on the valve current. Current in the valve V11 then flows to the screen grid, the resting level of the potential on the suppressor grid being sufficient to prevent the valve current reaching the anode, and the voltage on the screen grid falls to a low value. Pulses in the multiplier (N) not occurring simultaneously with the applied *p* pulse will produce no change in potential on the control grid of the valve V11 as the diode D11 is then conducting. Positive pulses representing the multiplicand (M) are fed via a terminal T11 and from a resting level of —60 volts to the suppressor grid of the valve V11. These pulses produce negative pulses at the anode of the valve V11 only when the valve current has been turned on by the simultaneous occurrence of a multiplier (N) pulse and *p* pulse. A condenser C13 connected between the control grid circuit of the valve V11 and earth tends to maintain the potential on the control grid at a steady value.

In order to maintain the valve V11 in the conducting condition after the occurrence of a coincidence between a pulse in the multiplier N and a *p* pulse, positive dash pulses (Fig. 7(*a*)) of 60 volts amplitude are fed from the dash pulse generator DPG to the anode of a diode D14. These pulses raise the potential at point *x* at the cathode of D14 to 270 volts. A condenser C12 has one electrode connected to the point *x* and through a resistance R16 to the screen grid of valve V11 and the other electrode connected via the resistances R12 and R13 to the control grid of the valve V11, thus during the intervals between dash pulses the potential at the point *x* falls due to the discharge of the condenser C12 towards the low potential on the screen grid of the valve V11; the potential at *x* is shown at Fig. 7(*b*). The potential at the point *x* (Fig. 7(*b*)) is differentiated by a differentiating circuit consisting of the condenser C12 and resistance R12 to produce the potential shown in Fig. 7(*c*) at the point *y*, the sharp positive pulses of this potential being coincident with the leading edges of the dash pulses. These sharp positive pulses are applied through a diode D13 to the condenser C13 connected between grid circuit of valve V11 and earth and restore any charge which has leaked away from the condenser during the preceding digit period. Thus the valve current is maintained turned on at the control grid and each positive pulse of the multiplicand (M) produces a negative pulse at the anode of the valve V11. The potential on the control grid of valve V11, shown in Fig. 7(*d*), sets itself at a value approximately the same as that at the cathode of this valve and tends to fall slowly towards a potential of —10 volts since the control grid is connected through the resistance R13, R12 and R11 to a source of —10 volts. It should be noted that until the valve current of V11 flows to the screen grid, due to the coincidence of the applied *p* pulse and a pulse in the multiplier (N), the positive dash pulses cannot render the diode D14 conducting, as the cathode of D14 is then at a potential of +300 volts since the resistance R16 which connects the diode to the screen grid of the valve V11 is conducted through a resistance R17 to a potential of +300 volts.

When the valve V11 has had its anode current turned on by the coincidence of a *p* pulse and a digit pulse in the multiplier (N) the anode current remains on until action is taken to cut it off again. In order to render the gate circuits non-conducting when the multiplication is completed or before a new multiplier (N) is fed in to condition them, it is necessary to apply a negative pulse to the cathode of the valve V11 and then to interrupt the dash pulses for a short period sufficient to allow the screen potential to recover to +300 volts.

When the multiplying circuit is employed in a binary digital computing machine in which the time interval occupied by the digits of a single number, e. g. the multiplicand (M) is defined by a time-base voltage, e. g. that shown in Fig. 2(*d*), the necessary pulse for clearing the gate circuits may be derived from the fly-back portion of the time-base voltage. A pulse derived from the fly-back portion may also be used to prevent access of the dash pulses to the gate circuit. In such a calculating machine the multiplier (N) and multiplicand (M) may be derived from a storage device, e. g. that described in a paper by F. C. Williams and T. Kilburn entitled "A storage system for use with binary digital computing machines" and published in "The Proceedings of the Institution of Electrical Engineers," part III, No. 40, March 1949, pages 81–100, in which case each will be fed to the multiplying circuit under the control of a time-base voltage.

In a practical computing machine the multiplying circuit would contain sufficient gate circuits adding devices and delay devices to multiply two 40 digit binary numbers. The saw tooth time base voltage will then have a run down time during 40 digit periods and a fly-back time during 5 digit periods, each digit period lasting 8.5 microseconds.

I claim:

1. A circuit for obtaining a signal representing the product of two numbers each of which is represented in the binary scale of notation by a signal comprising a series of sequentially occurring electrical pulses, characterised by a sequence of gate circuits arranged to be conditioned respectively by the digit pulses of one of said numbers, the first gate circuit being conditioned by the digit of greatest significance, the second gate circuit by the digit of next greatest significance and so on, the last gate circuit being conditioned by the digit of least significance, means for feeding the signal representing the other of said numbers simultaneously to all said gate circuits in parallel, a sequence of delay devices each of which is arranged to introduce a delay equal to the inter-digit period of the signals representing the said numbers and a sequence of adding devices, the output of the first gate circuit being connected to the input of the first delay device, the outputs of the second gate circuit and the first delay device being connected to the input of the first adding device, the output of the first adding device being connected to the input of the second delay device, the outputs of the third gate circuit and the second delay device being connected to the input of the second adding device and so on to yield the required signal at the output of the last adding device.

2. A multiplying circuit for multiplying two binary numbers a multiplicand M, and multiplier represented by the series $A_k.2^k+A_{k-1}.2^{k-1}+ \ldots +A_1.2^1+A_0.2^0$ ($A_k$, $A_{k-1}$ etc., being either "1" or "0") in each of which the digit "0" is represented by a signal of a first kind and the digit "1" is represented by a signal of a second kind, the signal representing a digit occurring in an instant which is separated from the instant in which the signal representing the digits of next higher and next lower signitficance occur by a predetermined time (the inter-digit period) and comprising $k+1$ gating devices, one for each digit of the multiplier, each of said gating devices adapted to be conditioned by a signal representing a different digit of the multiplier, means for conditioning said gating devices by signals representing the multiplier, means for feeding to said gating devices signals representing the multiplicand M whereby to obtain from the respective gating devices signals representing the numbers $M.A_k$, $M.A_{k-1}$, ... $M.A_1$ and $M.A_0$, a plurality of series connected adding devices, means respectively coupling said gating devices to said adding devices, the first adding device in the series receiving the output from the gating device adapted to be conditioned by the signal in the multiplier representing the digit of highest significance via a delay device introducing a delay equal to the inter-digit period and each subsequent adding device receiving the output of the preceding adding device via a delay device introducing a delay equal to the inter-digit period.

3. A multiplying circuit for multiplying two binary members (the multiplier and multiplicand) in each of which the digit "1" is represented by a pulse and the digit "0" by the absence of a pulse, the signal representing each digit being allocated a separate instant which is separated from the signal representing the digit of next higher and next lower significance by a predetermined time (the inter-digit period) and comprising a plurality of normally non-conducting gate circuits, one for each digit of the multiplier, each of which is adapted to be conditioned by a signal representing a different digit in the multiplier, means for rendering a gate circuit conducting if the signal adapted to condition it is a pulse (i. e. a "1"), means for applying the train of pulses representing the multiplicand to all of said gate circuits, and means for adding the outputs from all of the said gate circuits in a plurality of series connected adding devices, the first adding device in the series receiving its input from the gate circuit adapted to be conditioned by the signal in the multiplier representing the digit of highest significance via a delay device introducing a delay equal to the inter-digit period, and each subsequent adding device receiving the output of the previous adding device via a delay device introducing a delay equal to the inter-digit period.

4. A multiplying circuit as claimed in claim 3 wherein the train of pulses representing the multiplier is fed in parallel to all the gate circuits, and each gate circuit is fed with a pulse (a *p* pulse) coincident in time with the signal with which it is adapted to be conditioned and wherein a gate circuit is rendered conducting only if it receives a *p* pulse and a pulse from the train of pulses representing the multiplier simultaneously.

5. A multiplying circuit as claimed in claim 4 wherein each gate circuit is fed with a train of regularly recurring pulses separated from each other by the inter-digit period whereby a gate circuit is maintained in the conducting condition for a predetermined time after the simultaneous occurrence of a *p* pulse and a pulse from the train of pulses representing the multiplier.

6. A multiplying circuit as claimed in claim 1 wherein a train of regularly recurring pulses separated from each other by the inter-digit period is fed to the delay devices to control the delay period.

7. A circuit according to claim 6 in which each delay device comprises a first thermionic valve arranged to be switched off by the leading edge of one of the said regularly recurring pulses and then switched on by the trailing edge of a digit pulse to be delayed, a second thermionic valve fed by said first valve so as to be switched on by the potential change produced by the leading edge of the next of said regularly recurring pulses, and means for feeding said regularly recurring pulses to said second valve in such polarity that their trailing edges switch said second valve off.

8. A circuit for receiving two input trains of pulses representative of numbers in the binary digital code and for producing a third output train of pulses representative of the product of said two input trains comprising a first input circuit receiving the first of said input trains, a plurality of switching devices connected in parallel with said first input circuit, each of said switching devices having two stable modes of operation, selective pulsing means coupled to each of said switching devices and successively causing each of said switching means to be responsive to a different digit of said first input train, said switching means each switching from the first of said modes to the second of said modes only when its corresponding digit is of a predetermined state, a second input circuit receiving the second of said input trains, means coupling each of said switching means to said second input circuit in parallel therewith, said switching means being so constructed and arranged that digits, of said predetermined state, of said second train of pulses pass through said switching means of said second mode, a plurality of series connected adding circuits respectively coupled to said switching circuits, and a plurality of delay circuits, each of said adding circuits being coupled to the next adding circuit in said series of adding circuits through one of said delay circuits of said plurality of delay circuits.

9. A circuit for receiving two successively occurring input trains of pulses, each of said trains being representative of a number in the binary digital code by the signal content of successive digit-intervals in such trains being of one or the other of two possible states, and for producing a third output train of pulses similarly representative of the product of said numbers in the binary digital code, comprising a first input circuit for receiving the first of said two input trains, a second input circuit for receiving the second of said two input trains, normally closed gating means coupled to said first and second input circuits in parallel with each, a pulsing circuit coupled to each of said gating means so arranged and constructed that only one of said gating means may be opened at a given time in response to a digit input of a predetermined state, said gating means being selectively opened in response to said pulsing circuit and to the states of pulses in said first input train, a plurality of series connected adding circuits coupled respectively to said gating means, a plurality of delay circuits interposed between said adding circuits, each of said delay circuits being so arranged and constructed that the output of a given adding circuit is delayed by the digit interval time period between two adjacent digits of said input trains, and return means coupled to each of said gating circuits and including means for returning all said gating means to a closed state upon the conclusion of said second input train.

10. A circuit as claimed in claim 9 in which said pulsing circuit includes an input, a pulse generator producing a train of control pulses separated from one another by a predetermined inter-digit period coupled to said input, a plurality of outputs from said pulsing means respectively coupled to said gating means, and means responsive to said train of control pulses and successively producing an output pulse in each of said outputs.

11. A circuit as claimed in claim 10 in which said pulse generator is also coupled respectively to said plurality of delay means, said train of control pulses controlling the delay period of each of said delay means.

12. A circuit as claimed in claim 9 in which there is one more gating means than there are adding circuits, said additional gating means being coupled to one of said adding circuits through one of said delay means, the others of said gating means being coupled directly to said adding circuits.

13. A circuit as claimed in claim 9 in which said return means includes a time base generator, the period of the output of said time base generator being determined by the number of digits in said second input train.

References Cited in the file of this patent

UNITED STATES PATENTS

| Number | Name | Date |
|---|---|---|
| 2,404,047 | Flory et al. | July 16, 1946 |
| 2,409,689 | Morton et al. | Oct. 22, 1946 |
| 2,428,812 | Rajchman | Oct. 14, 1947 |
| 2,429,228 | Herbst | Oct. 21, 1947 |
| 2,445,215 | Flory | July 13, 1948 |